(12) United States Patent
Barthelme et al.

(10) Patent No.: US 12,012,992 B2
(45) Date of Patent: Jun. 18, 2024

(54) NON-LOCATING BEARING ASSEMBLY

(71) Applicant: AKTIEBOLAGET SKF, Gothenburg (SE)

(72) Inventors: Juergen Barthelme, Grettstadt (DE); Helmut Hauck, Euerbach (DE); Sebastian Kraus, Schwanfeld (DE); Andreas Herbert Kraus, Bergrheinfeld (DE); Stefanie Seufert, Rothhausen (DE); Alexander Dilje, Schweinfurt (DE); Hans-Juergen Friedrich, Königsberg-Römershofen (DE); Berthold Beyfuss, Wasserlosen-Kaisten (DE)

(73) Assignee: AKTIEBOLAGET SKF, Gothenburg (SE)

( * ) Notice: Subject to any disclaimer, the term of this patent is extended or adjusted under 35 U.S.C. 154(b) by 135 days.

(21) Appl. No.: 17/824,938

(22) Filed: May 26, 2022

(65) Prior Publication Data

US 2022/0389958 A1 Dec. 8, 2022

(30) Foreign Application Priority Data

Jun. 8, 2021 (DE) .......................... 102021205791.8

(51) Int. Cl.
*F16C 35/07* (2006.01)
*F16C 19/16* (2006.01)
(Continued)

(52) U.S. Cl.
CPC .............. *F16C 25/08* (2013.01); *F16C 19/16* (2013.01); *F16C 27/066* (2013.01); *F16C 35/045* (2013.01); *F16C 35/077* (2013.01)

(58) Field of Classification Search
CPC .......... F16C 19/16; F16C 23/08; F16C 25/06; F16C 25/08; F16C 25/083; F16C 27/04;
(Continued)

(56) References Cited

U.S. PATENT DOCUMENTS 1,758,667 A * 5/1930 Hughes ................. F16C 35/077
384/613
2,530,323 A * 11/1950 Boyd ...................... F16C 23/08
384/611

(Continued)

FOREIGN PATENT DOCUMENTS

JP 2003032958 A * 1/2003 ............ F16C 25/083

OTHER PUBLICATIONS

Machine Translation of JP-2003032958-A (Year: 2003).*

*Primary Examiner* — Alan B Waits
(74) *Attorney, Agent, or Firm* — J-TEK LAW PLLC; Scott T. Wakeman; Mark A. Ussai

(57) ABSTRACT

A non-locating bearing assembly includes a bearing unit configured to support a rotatable component relative to a stationary component, the bearing unit including a first stationary bearing ring and a second rotatable bearing ring, the rotatable bearing ring being fixedly connectable to the rotatable component, and a bearing carrier. The stationary bearing ring is axially and rotationally fixed to the bearing carrier, and the bearing carrier is configured to connect to the stationary component in a rotationally fixed but axially displaceable manner.

15 Claims, 7 Drawing Sheets

(51) Int. Cl.
 *F16C 25/08* (2006.01)
 *F16C 27/06* (2006.01)
 *F16C 35/04* (2006.01)
 *F16C 35/077* (2006.01)

(58) Field of Classification Search
 CPC ........ F16C 27/06; F16C 27/066; F16C 27/08;
 F16C 35/042; F16C 35/045; F16C 35/077
 See application file for complete search history.

(56) References Cited

U.S. PATENT DOCUMENTS

| | | | | |
|---|---|---|---|---|
| 4,556,331 | A | * 12/1985 | Munde | F16C 25/083 |
| | | | | 384/453 |
| 2004/0134708 | A1 | * 7/2004 | Tanaka | F16C 35/077 |
| | | | | 180/417 |
| 2009/0148092 | A1 | * 6/2009 | Otsuka | F16C 35/067 |
| | | | | 384/569 |

* cited by examiner

NON-LOCATING BEARING ASSEMBLY

CROSS-REFERENCE

This application claims priority to German patent application no. 10 2021 205 791.8 filed on Jun. 8, 2021, the contents of which are fully incorporated herein by reference.

TECHNOLOGICAL FIELD

The present invention relates to a non-locating bearing assembly according to the preamble of patent claim 1.

BACKGROUND

Non-locating bearing assemblies are always used when a stationary bearing ring of a bearing unit is to be movably supported axially relative to a component receiving the bearing unit. Such an axial displacement is necessary in particular when different coefficients of thermal expansion prevail between the stationary component and the bearing. These different thermal expansions lead to a variable fit between stationary bearing ring and stationary component, which can lead to damage to the bearing or the stationary component when they are not compensated for.

The reason for this is that this variable fit causes the bearing ring that is supposed to be stationary to co-rotate with the rotating bearing ring. This creeping or co-rotation of the stationary bearing ring then leads to damage to the bearing and must therefore be prevented.

It is also problematic that the variable fit can also lead to a blockage of the axial displaceability, which negatively influences or damages not only the bearing, but the entire component to which the non-locating bearing assembly is attached.

In order to in particular counter the different thermal expansions, in the prior art it has been proposed to provide the stationary component with a so-called inlay that has the same thermal expansion properties as the stationary bearing ring. Thus it has been proposed in particular to introduce a steel ring between bearing ring and stationary component, which steel ring, however, can be introduced into the stationary component only at high expense, such as, for example, by welding, soldering, adhering, screwing, or in-situ injecting. In addition, this ring must subsequently be machined and matched to all individual elements so that the tolerances of all elements can be set. However, this requires a very high installation expense, which in turn leads to high costs.

SUMMARY

An aspect of the present disclosure is therefore to provide a non-locating bearing assembly that provides a rotational securing, an axial clearance reduction, and a temperature expansion compensation, and is simple to install.

In the following a non-locating bearing assembly is disclosed that includes a bearing unit that is configured to support a rotating component relative to a stationary component.

The non-locating bearing assembly includes a first stationary bearing ring and a second rotatable bearing ring, wherein the rotatable bearing ring is fixedly connectable to the rotating component.

In order to achieve the axial mobility but rotational immobility that is required for a non-locating bearing, the stationary bearing ring itself is not designed to be movable as usual, but rather the bearing unit is fixedly attached in a bearing carrier and the bearing carrier is attached to the stationary support in an axially movable manner. Damage to the bearing itself by a co-rotation of the stationary bearing ring can thereby be reliably prevented. In addition, such a bearing assembly is particularly simple to install since the bearing unit and the bearing carrier can preferably be used as a preassembled component, and no expensive setting of bearing tolerances need be effected. In addition, the attachment options between the bearing carrier and the stationary component are more diverse than when the stationary bearing ring itself must be supported in an axially displaceable manner on a stationary component. Problems with difficult environmental conditions, such as, for example, an aging of friction connections or a reduced friction fit due to an oil environment, can also be solved by the axially movable attachment of the bearing carrier.

The bearing carrier itself can be manufactured from the same material as the bearing ring. However, it is also possible to use different materials, in particular also materials having different coefficients of thermal expansion. Since the bearing is fixedly connected to the bearing carrier, here, as also with fixed bearings, there is no risk of co-rotation with different thermal expansion.

According to one preferred exemplary embodiment, at least one spring element is furthermore disposed between the bearing carrier and the stationary component. The spring element ensures that with an axial displacement of the bearing carrier under axial load, the bearing carrier returns again into its initial position.

It is preferred here in particular when the at least one spring element interacts with the bearing carrier and the stationary component such that the axially displaceable bearing carrier is attached to the stationary component in an axially preloaded manner. The axial preload provides a base position for the relative arrangement of the bearing carrier and the stationary component and simultaneously ensures that a return into the base position is ensured even with an age-related fatigue of the spring element.

According to a further preferred exemplary embodiment, the non-locating bearing assembly is provided as a preassembled unit made of the bearing carrier, the bearing unit, and the at least one spring element. A particularly simple installation is thereby possible. In addition, a defined preload can also be set in a problem-free manner.

According to a further preferred exemplary embodiment, the bearing carrier is configured pot-shaped, including a pot wall that extends axially around the stationary bearing ring, a pot base that supports the stationary bearing ring on an axial side, and a flange configured as a pot rim, which is configured to receive at least one attachment means by which the bearing carrier is attachable to the stationary component or to interact with it, such that it is axially displaceable but such that they are rotationally fixed. Such a design makes possible on the one hand a good and fixed receiving of the bearing unit in the bearing carrier and on the other hand a simple attaching of the bearing carrier to the stationary component.

Here the bearing carrier can be manufactured one-piece, but it is also possible, for example, to form the flange and the pot separately, wherein the flange can be attached to the pot by interference-fit, in particular using a bayonet closure.

It is preferred here in particular when at least one pin element is provided as attachment means, which pin element is fixedly connected to the bearing carrier and which is axially movably receivable in a, preferably complementarily designed, receptacle in the stationary component, wherein the pin element is axially movably received in the receptacle. Alternatively or additionally, the pin element can also be fixedly connected to the stationary component and axially movably receivable into a, preferably complementarily designed, receptacle on the bearing carrier, wherein the pin element is axially movably received in the receptacle. Such pins are easy to attach and introduce and represent a secure rotationally fixed connection. Since they usually also have a smooth surface, they can also easily move axially into the corresponding receptacle.

As a further preferred exemplary embodiment shows, the spring element itself can be configured as a resilient tab designed on the bearing carrier. It is preferred here in particular when the tabs are manufactured integrally with the bearing carrier. Such tabs are particularly simple to manufacture by, for example, by cutting out and bending them from a metal material, such as, for example, the material of the bearing carrier. The tabs are preferably formed integrally with the pot base and/or the flange. Both sections of the bearing carrier make possible axial support between bearing carrier and stationary component.

Alternatively or additionally, the at least one spring element can be configured as a separate wave spring. Wave springs are conventionally used with non-locating-bearing/locating-bearing assemblies and are already designed and dimensioned for corresponding applications. A testing for new settings of preload and new experience values with respect to spring aging can thereby be omitted.

According to a particularly preferred exemplary embodiment, the wave spring includes a first axially resilient spring section including at least one one-layer wave-shaped spring layer that provides a spring force in the axial direction of the wave spring and includes a further radially resilient spring section that is configured to exert a radial spring force.

Using this radially acting spring force, the shaft spring can enter into operative connection with the bearing carrier so that via the radial spring section a friction- and/or force-fit between the wave spring and the bearing carrier can be provided, which makes possible an attaching of the wave spring to the bearing carrier and allows it to be easily undertaken.

According to one preferred exemplary embodiment, the radially resilient spring section includes a radially resilient spiral spring including at least one winding. A radially resilient spiral spring is on the one hand easy to manufacture and on the other hand has a maximum friction surface due to its circumferential enclosing of the bearing carrier, which maximizes the friction- or force-fit. If the circumferentially resilient spiral spring has not only one winding, but a plurality of windings lying one atop the other, then the friction forces in the spring windings themselves increase the spring force and thus improve the seat of the spring against the bearing carrier.

According to a further preferred exemplary embodiment, the radially resilient spring section is configured as a radially resilient membrane or plate spring. Such a design makes possible a simple installation on the bearing carrier without unnecessarily reducing the strength of the friction- and/or force-fit, in order to ensure an installability on the bearing carrier.

Furthermore, it is preferred that the axially resilient spring section and the radially resilient spring section are manufactured from the same spring steel. Such a design prevents the spring effect from decreasing due to different thermal expansions.

According to a particularly preferred exemplary embodiment, the wave spring is manufactured from a continuous flat wire that forms both the axially resilient spring section and the radially resilient spring section. For this purpose the flat wire can advantageously be rotated by 90° at the transition from the axially to the radially acting spring section so that a maximum abutment surface and thus also a maximum friction surface can be provided for the radial spring section. In addition, the wave spring can be manufactured in a manufacturing step without further costs and assembly expense.

According to a further preferred exemplary embodiment, the radially resilient spring section is manufactured from different material than the axially resilient spring section. Here both materials can indeed also be spring steel or metal, wherein, however, the alloy of the radially resilient spring steel is a different one than the axially resilient spring steel. Different requirements can thereby be addressed, and the spring forces can be optimized. Of course, it is also possible to manufacture the radially resilient spring section from a completely different material than the axially resilient spring section. For example, the radially resilient spring section can be comprised of a plastic material, while the axially resilient spring section is still manufactured as before from a spring steel. Thus it is possible, for example, to apply the radially resilient spring section onto the axially resilient spring section via an overmolding method, wherein in particular the radially resilient spring section includes radially acting spring tongues. Furthermore, it is advantageous when the radially resilient spring section is manufactured from an elastomer material. If such an elastomer material is used, then, for example, the axially resilient spring section and the radially resilient spring section can be connected to each other, for example, via vulcanization, so that the radially resilient spring section provides the radial spring effect via an elastic deformation of the material. This is the case, for example, with a rubber sleeve or a rubber ring.

It is advantageous here in particular when the bearing carrier includes a circumferentially extending recess in which the radially resilient spring section can be received. A spring seat can thereby be provided on the bearing carrier itself, which spring seat is simple to manufacture since the radial recess can be co-manufactured directly during the post-turning treatment of the bearing carrier without a further processing step being necessary. Here the circumferentially extending recess offers a defined space for the wave spring both in the axial direction and in the radial direction, more precisely, for the radial section of the wave spring, and it can simultaneously be ensured that the wave spring can be securely attached to the circumferentially extending recess with a radial spring force. In addition, the recess can be used to ensure that the wave spring does not increase the installation space requirement of the bearing.

This makes it possible again to provide a preassembled component made of the bearing carrier, the bearing unit, and the spring element even with use of a wave spring.

According to a further preferred exemplary embodiment, a plurality of spring elements are provided that are disposed circumferentially around the bearing carrier, in particular circumferentially around the flange. It is advantageous here in particular when the spring elements interact with at least a part of the attachment means disposed on the flange. Thus, for example, the spring elements can be configured as elastomer damping elements that include snap lugs by which they are snappable into attachment means configured as through-holes. Other mountings and designs of the elastomer damping elements are also of course possible.

Alternatively or additionally, the spring elements can also be configured as spiral springs that are attached to the attachment means and interact with them.

Furthermore, it is advantageous when the spring elements do not interact with all the attachment means, but only with a part. Since the spring elements often not only spring in the axial direction, but also have a certain mobility in the circumferential direction in the event of rotational load, it can be ensured by the rigid attachment means that the bearing carrier is attached to the stationary component such that it is only movable axially but not in the circumferential direction.

Further advantages and advantageous embodiments are specified in the description, the drawings, and the claims. Here in particular the combinations of features specified in the description and in the drawings are purely exemplary, so that the features can also be present individually or combined in other ways.

In the following the invention is described in more detail using the exemplary embodiments depicted in the drawings. Here the exemplary embodiments and the combinations shown in the exemplary embodiments are purely exemplary and are not intended to define the scope of the invention. This scope is defined solely by the pending claims.

DETAILED DESCRIPTION

Figure 1:
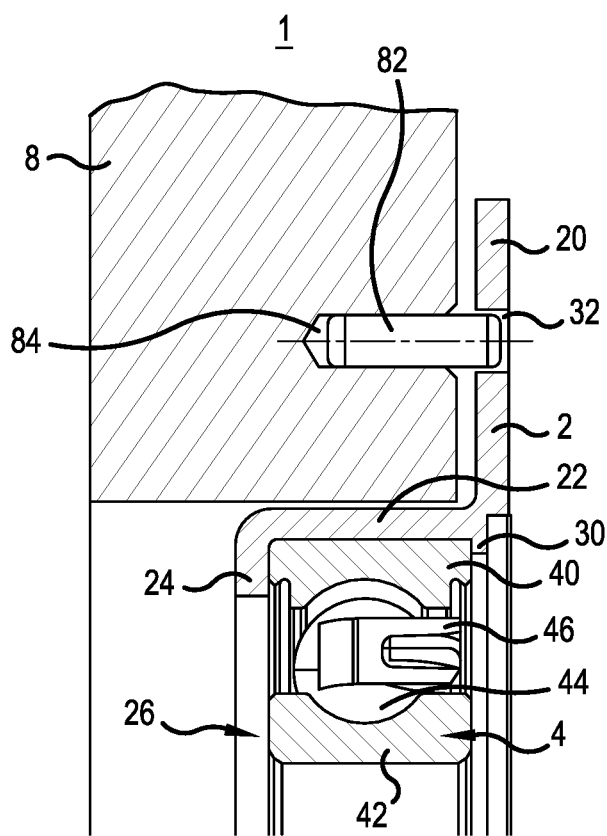
FIG. 1 is a schematic view of a non-locating bearing assembly including a bearing unit and a bearing carrier mounted on a stationary component according to a first embodiment of the disclosure.
Figure 2:
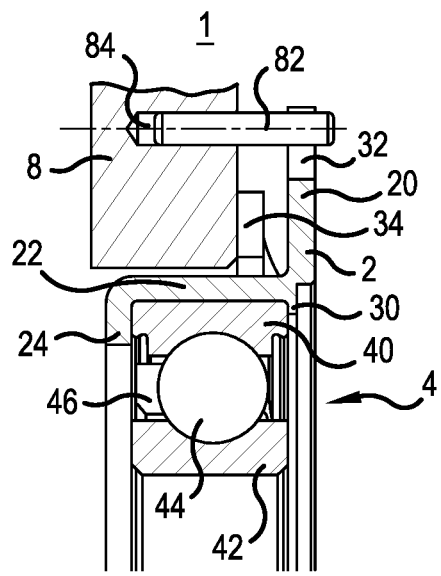
FIG. 2 is a sectional side elevational view of a non-locating bearing assembly including a bearing unit and a bearing carrier mounted on a stationary component according to a second embodiment of the disclosure.
Figure 4:
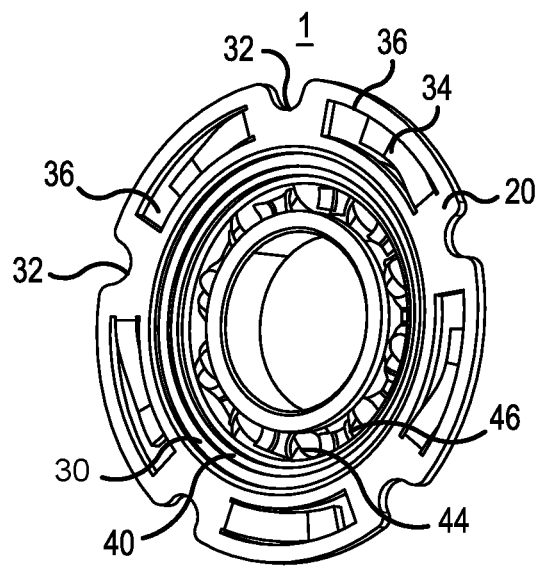
FIG. 4 is a first perspective view of the bearing unit and bearing carrier of FIG. 2.
Figure 3:
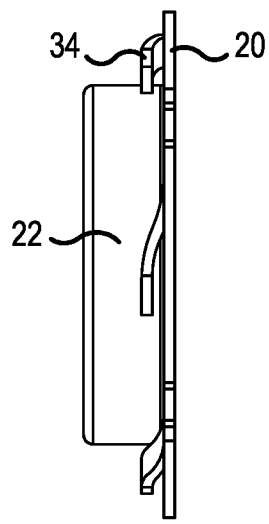
FIG. 3 is a side elevational view of the bearing carrier of FIG. 2.
Figure 5:
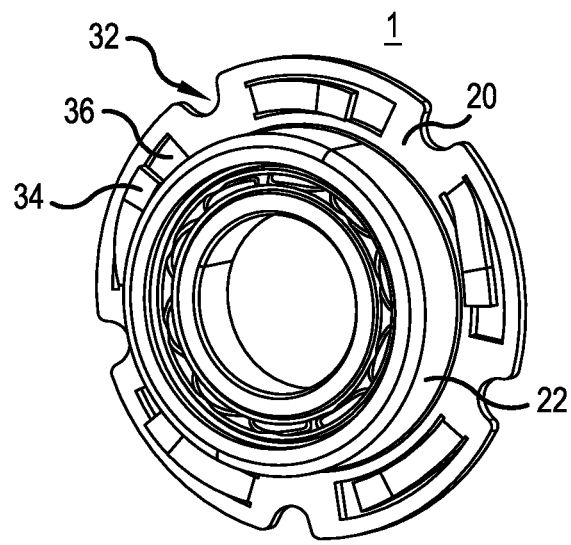
FIG. 5 is a second perspective view of the bearing unit and bearing carrier of FIG. 2.

In the following, identical or functionally equivalent elements are designated by the same reference numbers.

In the appended Figures, a plurality of exemplary embodiments are shown for a non-locating bearing assembly 1 in which a bearing unit 4 is received in a bearing carrier 2, the bearing carrier 2 being disposed on a stationary component such that they are rotationally fixed but such that the bearing carrier 2 is axially displaceable relative thereto. Here the bearing unit 4 is disposed in the bearing carrier 2 in a rotationally and axially fixed manner, and preferably so that the bearing unit 4 forms a preassembled unit at least with the bearing carrier 2.

As can be seen from the Figures, the bearing carrier 2 is configured essentially pot-shaped and includes a flange region 20, a pot wall region 22, and a pot base 24. The pot base 24 in turn includes an opening 26 through which a rotating component (not depicted), in particular a shaft, can be guided.

The rotating component in turn is connected to the bearing unit 4 such that they rotate together. This bearing unit 4 comprises an outer ring 40, which is configured in the depicted exemplary embodiment as a stationary bearing ring, and a rotatable bearing inner ring 42 that is fixedly connectable to the not-depicted shaft. The bearing rings 40 and 42 are spaced with respect to each other and include rolling elements 44 in their interior that are uniformly spaced and guided by a cage 46. In the exemplary embodiments depicted, the bearing unit 4 is configured as a ball bearing, but all other types of rolling-element bearings and also plain bearings are also equally usable.

As mentioned above, the bearing unit 4 is fixedly connected to the bearing carrier 2 so that the bearing outer ring 4 abuts on one side against the pot base 24 and is held on its other side by a stop 30. The stop 30 can be formed, for example, via a staking, and is preferably introduced after the bearing 4 has been inserted into the bearing carrier 2 so that a preassembled unit made of the bearing carrier 2 and the bearing unit 4 is provided.

Since the bearing unit 4 cannot be axially displaced on the bearing carrier 2, but this displaceability is necessary for a non-locating bearing assembly 1, the Figures show a plurality of ways to provide this axial displaceability of the bearing carrier 2 relative to the stationary component 8.

However, a connection between the stationary component 8 and the bearing carrier 2 such that they are rotationally fixed must also simultaneously be provided in order to prevent a co-rotation of the bearing carrier 2, and thus of the bearing outer ring 40, relative to the stationary component 8.

For this purpose attachment means are usually provided on the bearing carrier 2 or the stationary component 8, which attachment means interact with the stationary component 8 or the bearing carrier 2 such that the attachment means and the stationary component 8 or the bearing carrier 2 are rotationally fixed, but such that the attachment means are axially displaceable.

In the simplest exemplary embodiment of FIG. 1, openings 32 are provided on the flange region 20 of the bearing carrier 2, which openings 32 are configured as through-holes through the bearing carrier 2. In these through-holes 32 pins 82 can be received that are introduced into holes, in particular blind bores 84, that are provided in the stationary component 8 and extend into the openings 32. The bearing carrier 2 can be axially displaced on this pin 82. Both the bore 84 and the opening 32 are preferably formed essentially complementary to the pin 82 so that an axial displaceability but no rotational or radial movement of the bearing carrier 2 relative to the pin 82 is possible. The pin 82 can be attached in the receptacle 84 in particular via a press-fit, but it is also possible to screw the pin 82 into the receptacle 84 or to attach it there in another manner.

Alternatively it is also possible, of course, to connect the pin 82 to the bearing carrier 2, and design it to be axially movable in the receptacle 84.

In order to prevent a rattling or striking of the bearing carrier 2 against the stationary component 8, and/or to provide a preloaded non-locating bearing assembly 1, in FIGS. 2 to 20 a spring element or damping element is furthermore provided that limits the axial movability of the bearing carrier 2 relative to the stationary component, and/or ensures a preloaded arrangement of the bearing carrier 2 relative to the stationary component 8.

As can be seen from FIGS. 2 to 14, the spring element is realized as a tab 34 bent out from the bearing carrier; FIGS. 2 to 9 show that the tab is bent out from the flange 20 of the bearing carrier 2. As can be seen in particular from FIGS. 3 to 5, cuts 36 are distributed circumferentially in the flange region, using which cuts 36 the tabs 34 are cut out, and subsequently bent out from the surface of the flange 20. The cuts 36 can be introduced into the flange 20 using a laser cutting device.

In the exemplary embodiments depicted in FIGS. 2 to 5, the bearing carrier 2 is formed one-piece so that the flange 20 is formed one-piece with the pot wall 22 and the pot base 24.

Figure 6:
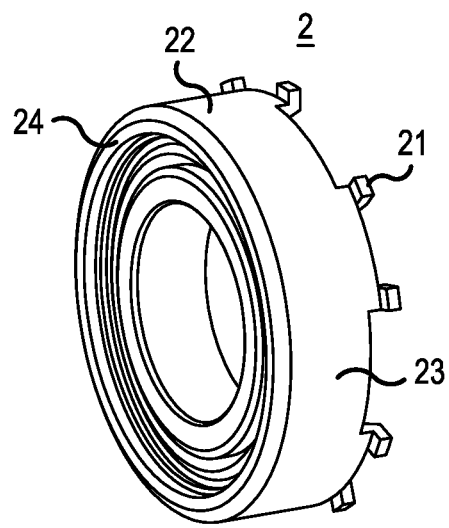
FIG. 6 is a perspective view of a pot element of a bearing carrier.
Figure 7:
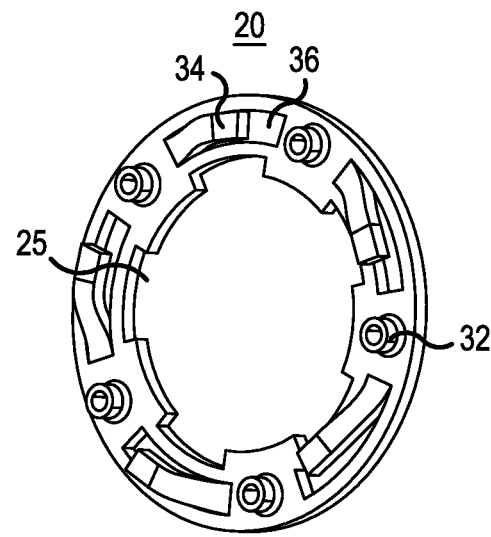
FIG. 7 is a perspective view of a flange element of a bearing carrier.
Figure 8:
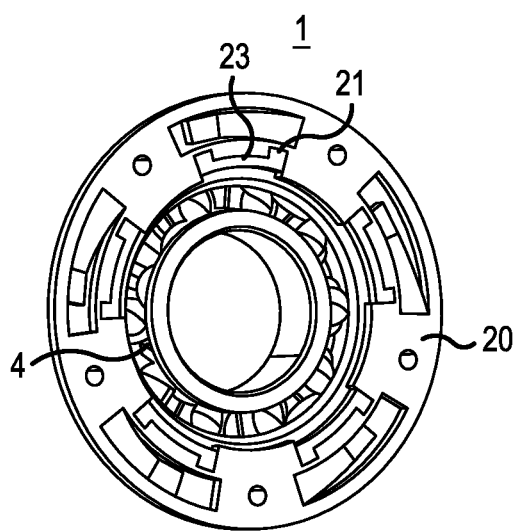
FIG. 8 is a first perspective view of the flange element of FIG. 7 connected to the pot element of FIG. 6.

Alternatively, however, the bearing carrier 2 can also be manufactured from two separate elements, namely the pot 23, the pot wall 22, and the pot base 24, and the flange 20, wherein FIG. 6 shows the pot 23, while FIG. 7 illustrates the flange 20. In order to connect the pot 23 to the flange 20 in an installation situation, radially protruding projections 21 are furthermore provided that engage in openings 25 on the flange region 20 in the form of a bayonet closure. This is depicted in particular in the installation situation, shown in FIGS. 8 and 9, wherein it is shown how the projections 21 interact with the flange region 20.

Figure 9:
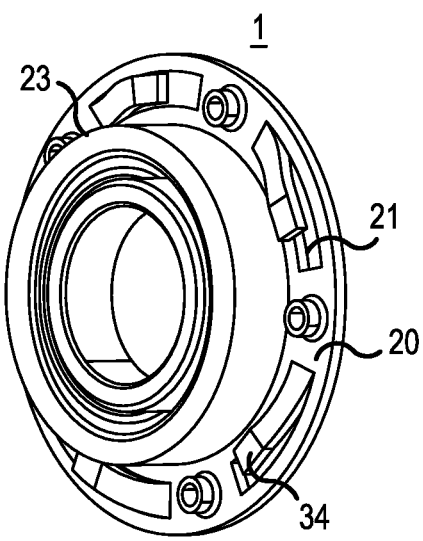
FIG. 9 is a second perspective view of the flange element of FIG. 7 connected to the pot element of FIG. 6.
Figure 10:
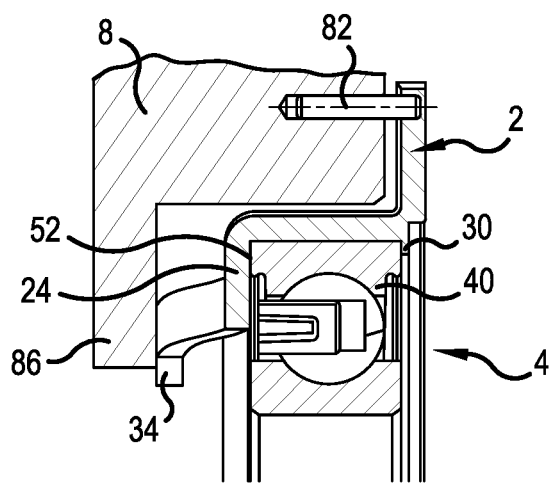
FIG. 10 is a sectional side elevational view of a non-locating bearing assembly including a bearing unit and a bearing carrier mounted on a stationary component according to a third embodiment of the disclosure.
Figure 11:
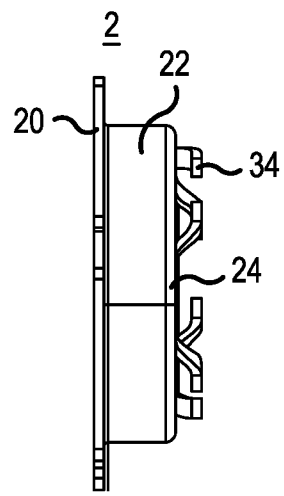
FIG. 11 is a side elevational view of the bearing unit and bearing carrier of FIG. 10.
Figure 12:
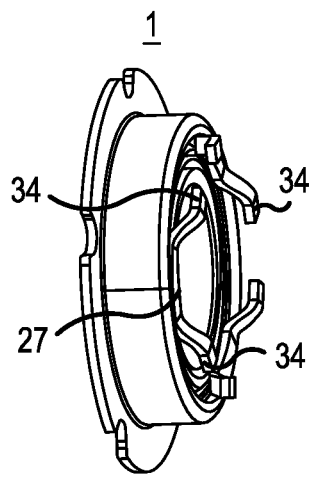
FIG. 12 is a first perspective view of the bearing unit and bearing carrier of FIG. 11.
Figure 13:
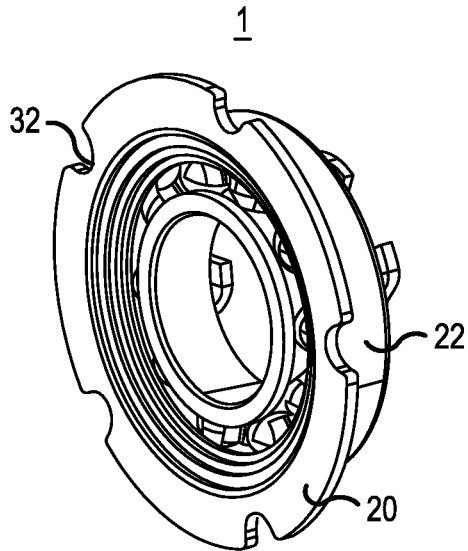
FIG. 13 is a second perspective view of the bearing unit and bearing carrier of FIG. 11.
Figure 14:
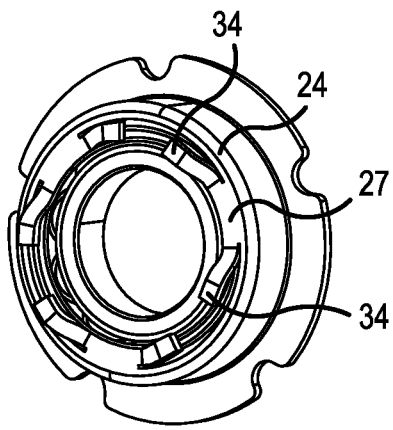
FIG. 14 is a third perspective view of the bearing unit and bearing carrier of FIG. 11.

In particular, FIG. 9 shows the bayonet engagement of the projections 21 on the flange region 20. Due to the snapping of the projections 21 into the flange region 20, the bearing 4 that is received in the pot of the bearing carrier 2 (see in particular FIG. 6 and FIG. 7), is in turn attached axially and such that the bearing 4 and pot of the bearing carrier 2 are rotationally fixed. A staked stop 30, as shown in FIGS. 2 to 5, can in this case be omitted.

Furthermore, FIGS. 10 to 14 show that the tabs 34 can be formed not only on the flange 20 but also from the pot base 24, which tabs are supported on a stop 86 of the stationary component 8. As can be seen in particular from FIG. 14, the spring elements 34 on the pot base 24 can be formed by cuts 36, using which the element 34 is separated from the pot base 24, and is then bent outward. Thus radially long-extending regions 27 nevertheless remain on the pot base 24, which regions 27 extend far over the end surface 52 of the bearing ring 40 (see here also FIG. 10).

The pot 23 and the flange 20 can also of course be formed two-part here.

Furthermore, FIGS. 2 to 5 and 10-15 show that the opening 32 in this exemplary embodiment is not configured as a through-hole, but rather as an indentation in which the pins 82 are receivable. In contrast, FIGS. 6 to 8, and later FIGS. 16 to 23, show exemplary embodiments in which the through-opening, as depicted in FIG. 1, is configured as a hole.

Figure 15:
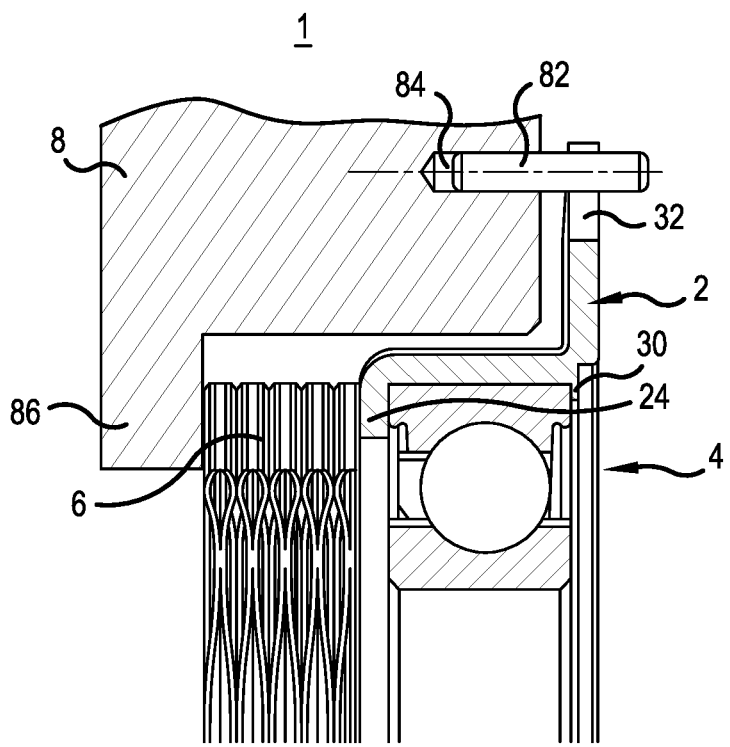
FIG. 15 is a sectional side elevational view of a non-locating bearing assembly including a bearing unit and a bearing carrier mounted on a stationary component according to a fourth embodiment of the disclosure.
Figure 16:
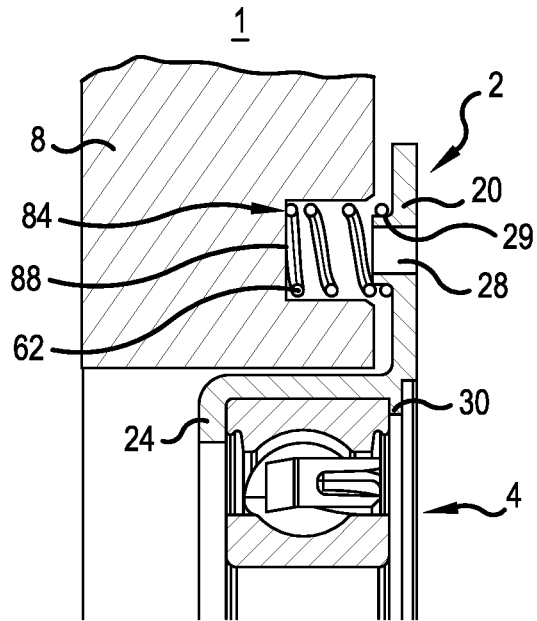
FIG. 16 is a sectional side elevational view taken through a first diameter of a non-locating bearing assembly including a bearing unit and a bearing carrier mounted on a stationary component according to a fifth embodiment of the disclosure.
Figure 17:
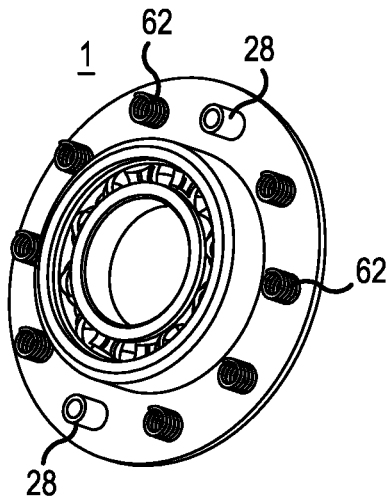
FIG. 17 is a perspective view of the bearing unit and bearing carrier of FIG. 16.
Figure 18:
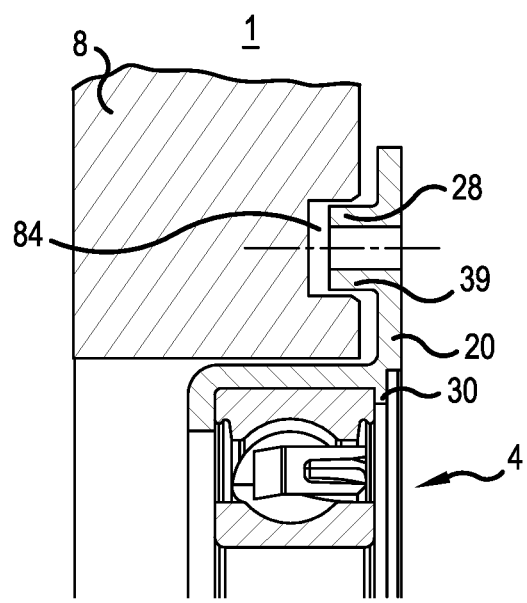
FIG. 18 is a sectional side elevational view taken through a second diameter of a non-locating bearing assembly including a bearing unit and a bearing carrier mounted on a stationary component according to the fifth embodiment of the disclosure.
Figure 19:
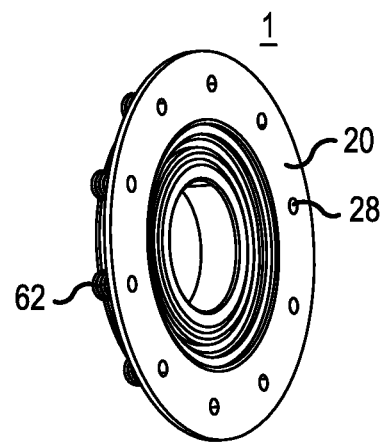
FIG. 19 is a second perspective view of the bearing unit and bearing carrier of FIG. 16.
Figure 20:
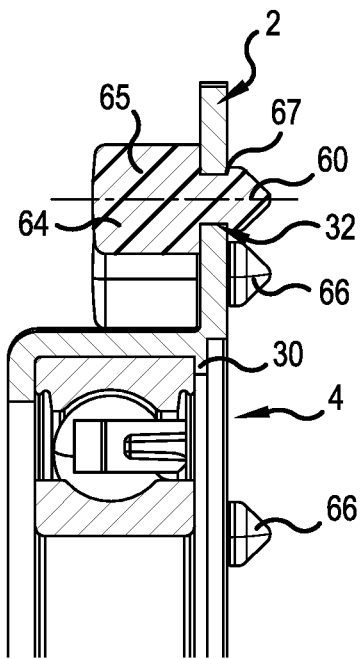
FIG. 20 is a sectional side elevational view along a first diameter of a bearing unit and bearing carrier according to a sixth embodiment of the present disclosure.
Figure 21:
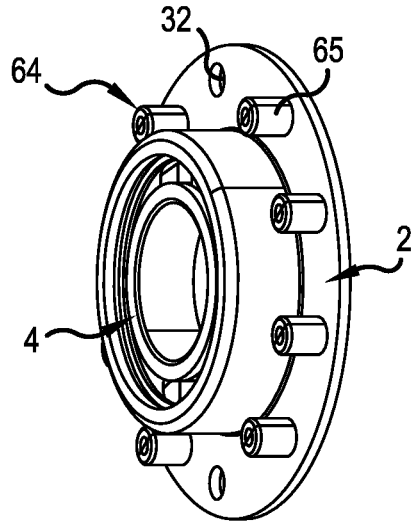
FIG. 21 is a first perspective view of the bearing unit and bearing carrier of FIG. 20.
Figure 22:
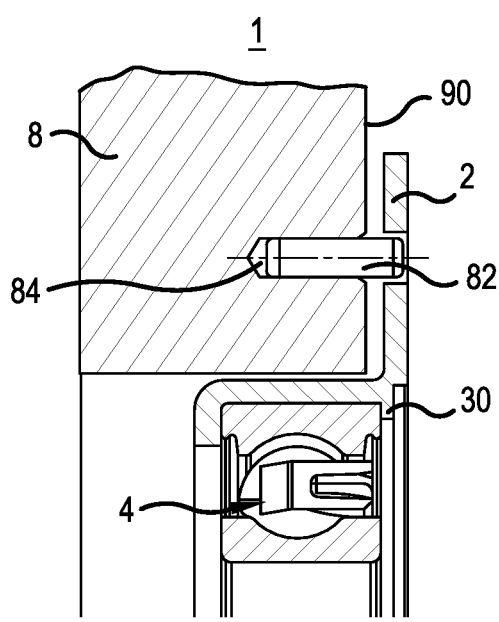
FIG. 22 is a sectional side elevational view along a second diameter of the bearing unit and bearing carrier of FIG. 20.
Figure 23:
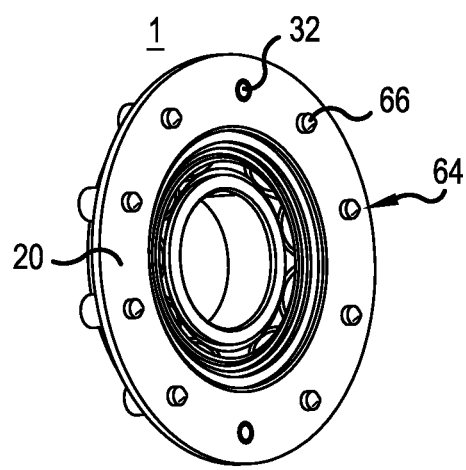
FIG. 23 is a second perspective view of the bearing unit and bearing carrier of FIG. 20.

FIG. 15 shows a further exemplary embodiment of the non-locating bearing assembly 1, wherein the bearing carrier 2 is resiliently supported on the stationary component 8. For this purpose a separate spring element takes the form of a wave spring 6 that is introduced on the stationary housing 8 between the pot base 24 and the stop 86. The bearing carrier 2 and the connection to the stationary housing are otherwise configured in an analogous manner to FIGS. 2 to 5. Instead of a wave spring 6, of course a plate spring or another type of spring element can also be disposed between pot base 24 and stop 86.

If a wave spring is used, it is furthermore advantageous when it includes an axially resilient and a radially resilient section, wherein the radially resilient section can interact with the bearing carrier 2 so that the wave spring 6 is captively attached to the bearing carrier 2, and the bearing carrier, bearing unit, and spring element can also be provided in this design as a preassembled component.

In addition to the spring element being provided as a large-surface component, it is also of course possible to design the pin 82 or the connection to the receptacle 84 on the stationary housing 8 as resilient. For this purpose, as depicted, for example, in FIGS. 16 to 19, the bearing carrier 2 can be equipped with an attachment element 28 that provides a spring seat 29, for example, via a certain projection. As can be seen in particular from the perspective view of FIG. 17, individual spring elements 62 can be provided on the spring seat 29, which spring elements 62 are configured as spiral springs in this exemplary embodiment. These spiral springs are supported on a base region 88 of the receptacle 84, and thus support the bearing carrier 2 to be relatively axially displaceably relative to the stationary component 8. In order to also produce a radial or circumferential attaching in order to provide a rotationally fixed connection, at least two attachment elements 28 are provided on the bearing carrier 2, which attachment element 28 are formed complementary to the receptacle 84 and are introduced into it, as can be seen in particular in FIG. 18, so that a movement in the circumferential direction of the bearing carrier 2 relative to the housing 8 is prevented. For this purpose the attachment element 28 has lengthened, axially extending side walls 39 that project into the receptacle 84, while the spring seat 29 is shortened and does not extend into the receptacle 84 (see FIG. 16).

In addition to the spiral springs, damping elements are also usable as spring elements. Such an exemplary embodiment is depicted in FIGS. 20 to 23, wherein elastomer elements 64 are introduced into the bearing carrier 2 that are supported on the stationary component 8, or inserted in a corresponding receptacle 84 on the component 8, and resiliently support the bearing carrier 2 by the stop 88 in the receptacle 84, in an analogous manner to the spring elements of FIGS. 16 to 19. Alternatively it is of course also possible that the elastomer elements interact directly with an end surface 90 of the stationary component, and for only the attachment elements 82 to dip into correspondingly designed receptacles 64 (see FIG. 22).

The elastomer elements 64 preferably include a main body 65 and connecting sections 66, wherein the connecting sections 66 are in turn equipped with undercuts 67 that interact with the corresponding openings 32 of the bearing carrier 2 in order to able to be captively snapped into them. In order to also produce a rotationally fixed connection here, furthermore in a manner analogous to the exemplary embodiment depicted in FIG. 1, an opening 32 is provided on the bearing carrier 2 that interacts with a pin 82 that is received in a corresponding receptacle 84 of the stationary component (see FIGS. 22 and 23).

In addition to the exemplary embodiments depicted in the Figures, of course other assemblies are also possible, using which the bearing carrier can be attached to the stationary component 8 such that the bearing carrier is axially movable but such that the bearing carrier and the stationary component 8 are rotationally fixed. Of course the bearing 4 can also be fixedly connected to the bearing carrier 2 in various ways. Furthermore, it is to be noted that all exemplary embodiments depicted in the Figures can also occur individually or in other combinations in non-depicted exemplary embodiments without deviating from the scope of protection of the application.

Overall, via the design of a movable bearing carrier 2 relative to the stationary component 8, a non-locating bearing assembly 1 can be provided that can withstand high rotational forces, but that nonetheless provides sufficient axial mobility in order to compensate for unequal coefficients of thermal expansion. In addition, the spring system makes possible a certain noise damping so that a striking of the elements under rotational load and axial movement is prevented.

Representative, non-limiting examples of the present invention were described above in detail with reference to the attached drawings. This detailed description is merely intended to teach a person of skill in the art further details for practicing preferred aspects of the present teachings and is not intended to limit the scope of the invention. Furthermore, each of the additional features and teachings disclosed above may be utilized separately or in conjunction with other features and teachings to provide improved non-locating bearing assemblies.

Moreover, combinations of features and steps disclosed in the above detailed description may not be necessary to practice the invention in the broadest sense, and are instead taught merely to particularly describe representative examples of the invention. Furthermore, various features of the above-described representative examples, as well as the various independent and dependent claims below, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter.

REFERENCE NUMBER LIST

1 Non-locating bearing assembly
2 Bearing carrier
4 Bearing unit
6 Spring element
20 Flange
21 Projections
23 Pot
22 Pot wall
24 Pot base
25 Opening
27 Radially extended pot base
29 Spring seat
30 Staking
32 Recess
34 Tab
36 Cutout
38 Extended side wall
40 Bearing outer ring
48 Groove
50, 52 End surface
60 Spring element
62 Spiral spring
64 Elastomer element
66 Attachment section
67 Undercut
8 Stationary component
82 Pin
84 Recess
84 Spring seat
88 Stop

What is claimed is:

1. A non-locating bearing assembly comprising:
a bearing unit configured to support a rotatable component relative to a stationary component, the bearing unit including a first stationary bearing ring and a second rotatable bearing ring, the rotatable bearing ring being fixedly connectable to the rotatable component,
a bearing carrier, the stationary bearing ring being axially and rotationally fixed to the bearing carrier, and
biasing means for biasing the bearing carrier away from the stationary component,
wherein the bearing carrier is configured to connect to the stationary component in a rotationally fixed but axially displaceable manner,
wherein the bearing carrier is pot-shaped and includes a cylindrical pot wall that extends axially around the stationary bearing ring,
wherein a pot base at one end of the pot wall supports an axial end of the stationary bearing ring, and a flange at another end of the pot wall is configured to cooperate with at least one connecting means for connecting the bearing carrier to the stationary component, and
wherein the biasing means comprises resilient tabs integrally formed from and bent out of the pot base or formed from and bent out of the flange.

2. The non-locating bearing assembly according to claim 1, wherein the non-locating bearing assembly is provided as a preassembled unit made of the bearing carrier and the bearing unit.

3. The non-locating bearing assembly according to claim 1,
wherein the flange and the connecting means are configured to support the bearing carrier relative to the stationary component in a rotationally fixed but axially displaceable manner.

4. The non-locating bearing assembly according to claim 3,
wherein the at least one connecting means comprises at least one pin fixedly connected to the bearing carrier and receivable in at least one complementary receptacle in the stationary component such that the at least one pin is freely axially movable in the at least one receptacle.

5. The non-locating bearing assembly according to claim 3,
wherein the at least one connecting means comprises at least one pin fixedly connected to the stationary component and receivable in at least one complementary receptacle in the bearing carrier such that the at least one pin is freely axially movable in the at least one receptacle.

6. The non-locating bearing assembly according to claim 1, wherein the resilient tabs are bent out of the pot base.

7. The non-locating bearing assembly according to claim 1, wherein the resilient tabs are bent out of the flange.

8. A non-locating bearing assembly comprising:
a bearing unit configured to support a rotatable component relative to a stationary component, the bearing unit including a first stationary bearing ring and a second rotatable bearing ring, the rotatable bearing ring being fixedly connectable to the rotatable component,
a bearing carrier, the stationary bearing ring being axially and rotationally fixed to the bearing carrier, and
biasing means for biasing the bearing carrier away from the stationary component, the biasing means comprising a wave spring,
wherein the bearing carrier is configured to connect to the stationary component in a rotationally fixed but axially displaceable manner, and
wherein the wave spring includes a first axially resilient spring section including at least one one-layer wave-shaped spring layer that provides a spring force in the axial direction of the wave spring, and includes a further radially resilient spring section that is configured to exert a radial spring force.

9. The non-locating bearing assembly according to claim 8, wherein the bearing carrier includes a circumferentially extending opening in which the radially resilient spring section is received.

10. The non-locating bearing assembly according to claim 8,
wherein the bearing carrier is pot-shaped and includes a cylindrical pot wall that extends axially around the stationary bearing ring,
wherein a pot base at one end of the pot wall supports an axial end of the stationary bearing ring, and a flange at another end of the pot wall is configured to cooperate with at least one connecting means for connecting the bearing carrier to the stationary component, and
wherein the wave spring is located between the pot base and the stationary component.

11. The non-locating bearing assembly according to claim 10,
wherein the flange and the connecting means are configured to support the bearing carrier relative to the stationary component in a rotationally fixed but axially displaceable manner.

12. The non-locating bearing assembly according to claim 11,
wherein the at least one connecting means comprises at least one pin fixedly connected to the bearing carrier and receivable in at least one complementary receptacle in the stationary component such that the at least one pin is freely axially movable in the at least one receptacle.

13. The non-locating bearing assembly according to claim 11,
wherein the at least one connecting means comprises at least one pin fixedly connected to the stationary component and receivable in at least one complementary receptacle in the bearing carrier such that the at least one pin is freely axially movable in the at least one receptacle.

14. A non-locating bearing assembly comprising:
a bearing unit configured to support a rotatable component relative to a stationary component, the bearing unit including a first stationary bearing ring and a second rotatable bearing ring, the rotatable bearing ring being fixedly connectable to the rotatable component,
a bearing carrier, the stationary bearing ring being axially and rotationally fixed to the bearing carrier,
biasing means for biasing the bearing carrier away from the stationary component, the biasing means comprising a plurality of spring elements disposed circumferentially around a flange of the bearing carrier, and
projections on the flange configured to extend into complementary openings in the stationary component to axially guide the bearing carrier and prevent rotation between the bearing carrier and the stationary component,
wherein the bearing carrier is configured to connect to the stationary component in a rotationally fixed but axially displaceable manner.

15. The non-locating bearing assembly according to claim 14,
wherein the bearing carrier is pot-shaped and includes a cylindrical pot wall that extends axially around the stationary bearing ring and a pot base at one end of the pot wall opposite the flange.

* * * * *